United States Patent [19]

Schmidt

[11] Patent Number: 4,755,131
[45] Date of Patent: Jul. 5, 1988

[54] FLUID COOLED HYDRAULIC ACTUATING MECHANISM FOR SINGLE CAVITY INJECTION MOLDING

[75] Inventor: Harald H. Schmidt, Georgetown, Canada

[73] Assignee: Mold-Masters Limited, Georgetown, Canada

[21] Appl. No.: 22,042

[22] Filed: Mar. 5, 1987

[30] Foreign Application Priority Data

Oct. 31, 1986 [CA] Canada ................................... 521950

[51] Int. Cl.⁴ ........................ B29C 45/20; B29C 45/72
[52] U.S. Cl. ................................ 425/549; 264/328.9; 264/328.15; 425/564; 425/566
[58] Field of Search ........... 264/328.9, 328.14, 328.15, 264/328.16, 328.1; 425/547, 548, 549, 552, 562, 563, 564, 566, 572, 573, 588

[56] References Cited

U.S. PATENT DOCUMENTS

| | | | |
|---|---|---|---|
| 3,037,245 | 6/1962 | Darnell | 425/562 |
| 4,026,518 | 5/1977 | Gellert | 251/330 |
| 4,222,733 | 9/1980 | Gellert et al. | 425/564 |
| 4,286,941 | 9/1981 | Gellert | 425/564 |
| 4,378,963 | 4/1983 | Schouenberg | 425/549 |
| 4,380,426 | 4/1983 | Wiles | 425/566 |
| 4,446,360 | 5/1984 | Gellert | 219/421 |
| 4,468,191 | 8/1984 | Gellert | 425/564 |
| 4,663,811 | 5/1987 | Gellert | 29/157 C |

OTHER PUBLICATIONS

Mold-Masters Manuel "Hydraulic Valve Gating Manuel", Apr. 1984, pp. 10-12.

Primary Examiner—Jay H. Woo
Assistant Examiner—Timothy W. Heitbrink
Attorney, Agent, or Firm—Riches, McKenzie & Herbert

[57] ABSTRACT

This invention relates to a valve gated single cavity injection molding system wherein the valve pin actuating mechanism is cooled by circulating hydraulic fluid through it. The cylinder is mounted in a cylinder housing inside a dome portion of a heated manifold housing. The cylinder housing has a wing portion extending out openings in each side of the manifold housing. Each wing portion has an inlet duct and an outlet duct for hydraulic fluid across which a pressure differential is applied. The ducts connect to circumferential channels which extend around the outside of the cylinder and lead to respective openings into the cylinder. Thus, the application of hydraulic fluid pressure during operation circulates hydraulic fluid through the actuating mechanism. The cooling which results extends the operating life of the mechanism, particularly the seals and O-rings.

8 Claims, 4 Drawing Sheets

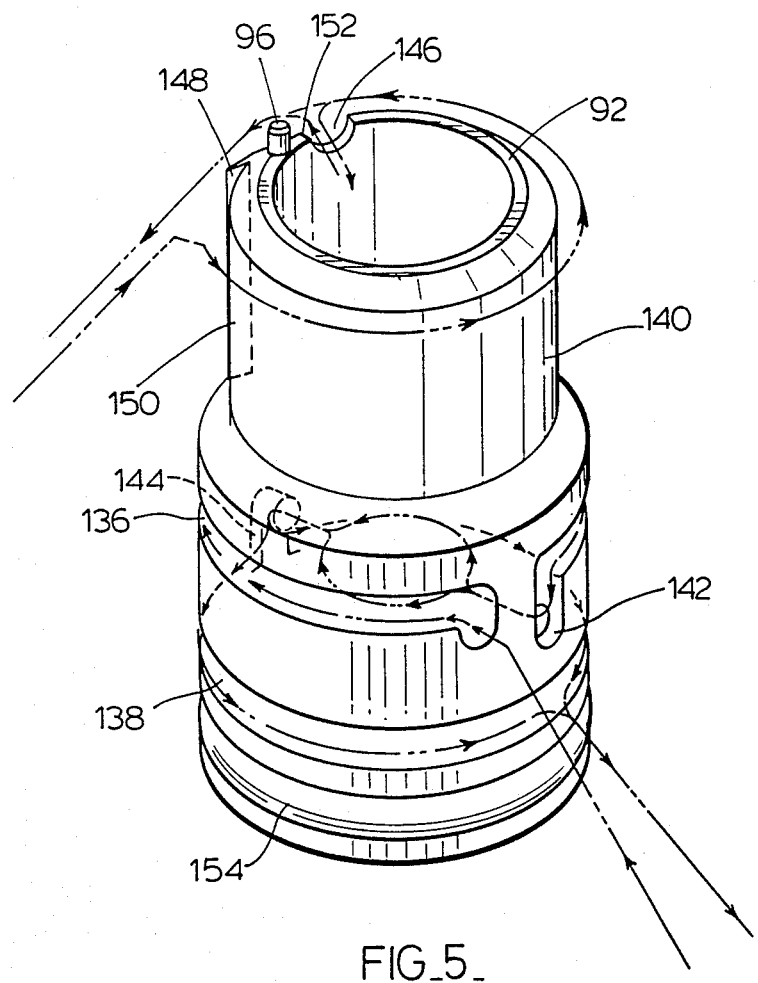
FIG_5

FLUID COOLED HYDRAULIC ACTUATING MECHANISM FOR SINGLE CAVITY INJECTION MOLDING

The invention relates to single cavity valve gated injection molding, and more particularly to improved hydraulic valve pin actuating mechanism which utilizes a flow of hydraulic fluid to provide cooling.

Single cavity injection molding systems with a central inlet are well known in the art. For instance, Gellert U.S. Pat. Nos. 4,026,518 entitled "Bushing Seal for Valve-Gated Injection Mold" which issued May 31, 1977; 4,222,733 entitled "Injection Molding Flow Control Mechanism" which issued Sept. 16, 1980; and 4,286,941 entitled "Injection Molding Nozzle Seal" which issued Sept. 1, 1981 all disclose mechanically actuated systems. More recently, the applicant's U.S. Pat. No. 4,380,426 entitled "Injection Molding Valve Pin Direct Pneumatic Actuator" which issued Apr. 19, 1983 dicloses a pneumatically actuated system. Of course, as shown in all of the previous systems, it is necessary that the melt flow passage be offset around at least part of the actuating mechanism which engages the driven end of the valve pin.

Hydraulically actuated injection molding is also well known in the art. For instance, Gellert U.S. Pat. No. 4,468,191 entitled "Hydraulically Actuated Injection Molding System with Alternate Hydraulic Connections" which issued Aug. 28, 1984 shows a hydraulically actuated multi-cavity system and several others are referred to therein. However, in a single cavity system with a central inlet the valve pin actuating mechanism in necessarily in close proximity to the melt passage and overheating of the actuating mechanism is problem. This is particularly true if the actuating mechanism is mounted inside a heated manifold housing as described in detail in the applicant's U.S. patent application Ser. No. 022,041 entitled "Dual Feed Single Cavity Injection Molding System" filed Mar. 5, 1987. The increasing demand to mold high performance engineering resins such as glass filled ULTEM (trade mark) where melt temperature are as high as 850° F. magnifies this problem. Overheating of the actuating mechanism can result in hardening or material decomposition and break down of seals and O-rings and the leakage of hydraulic fluid.

While unsatisfactory attempts have been made to use the flow of hydraulic fluid to cool the actuating mechanism none have produced an adequate flow of fluid through the hydraulic cylinder.

SUMMARY OF THE INVENTION

Accordingly, it is an object of the invention to at least partially overcome these problems by producing actuating mechanism for a single cavity valve gated system wherein a cooling flow of hydraulic fluid is provided through the cylinder on at least one side of the piston.

To this end, in one of its aspects, the invention provides a valve gated single cavity injection molding system comprising heated manifold means having a central inlet mounted in a mold back plate, a heated nozzle seated in a cavity plate with a central bore in alignment with the central inlet and a gate extending through the cavity plate to a cavity, an elongated valve pin having a driven end and a tip end mounted in a central bore of the nozzle, the driven end of the valve pin being operatively connected to hydraulic valve pin actuating mechanism whereby the valve pin is reciprocated between a retracted open position and a closed position wherein the tip end of the valve pin is seated in the gate, and a melt passage for conveying melt from the inlet to the gate, the melt passage being offset in the manifold means around the driven end of the valve pin and the actuating mechanism connected to it and extending around the valve pin in the central bore of the nozzle, with the improvement wherein the valve pin actuating mechanism comprises a cylinder housing with a central portion securely mounted in a position wherein an insulative air space is provided between the manifold means and the cylinder housing, a cylinder securely seated in the cylinder housing, a piston located in the cylinder and operatively connected to the driven end of the valve pin to reciprocate between the open and closed positions, and hydraulic fluid ducts extending through the cylinder housing to the cylinder, the ducts including a first inlet duct and a first outlet duct leading respectively to an inlet opening and an outlet opening through the cylinder on one side of the piston, a predetermined minimum pressure differential being applied between the first inlet and outlet ducts whereby a flow of hydraulic fluid is provided through the cylinder on said one side of the piston to provide cooling.

Further objects and advantages of the invention will appear from the following description taken together with the accompanying drawings.

BRIEF DESCRIPTION OF THE DRAWINGS

FIG. 5 is an isometric view of the cylinder showing schematically the flow of hydraulic fluid through and around it according to this preferred embodiment of the invention.

DETAILED DESCRIPTION OF THE DRAWINGS

Figure 1:
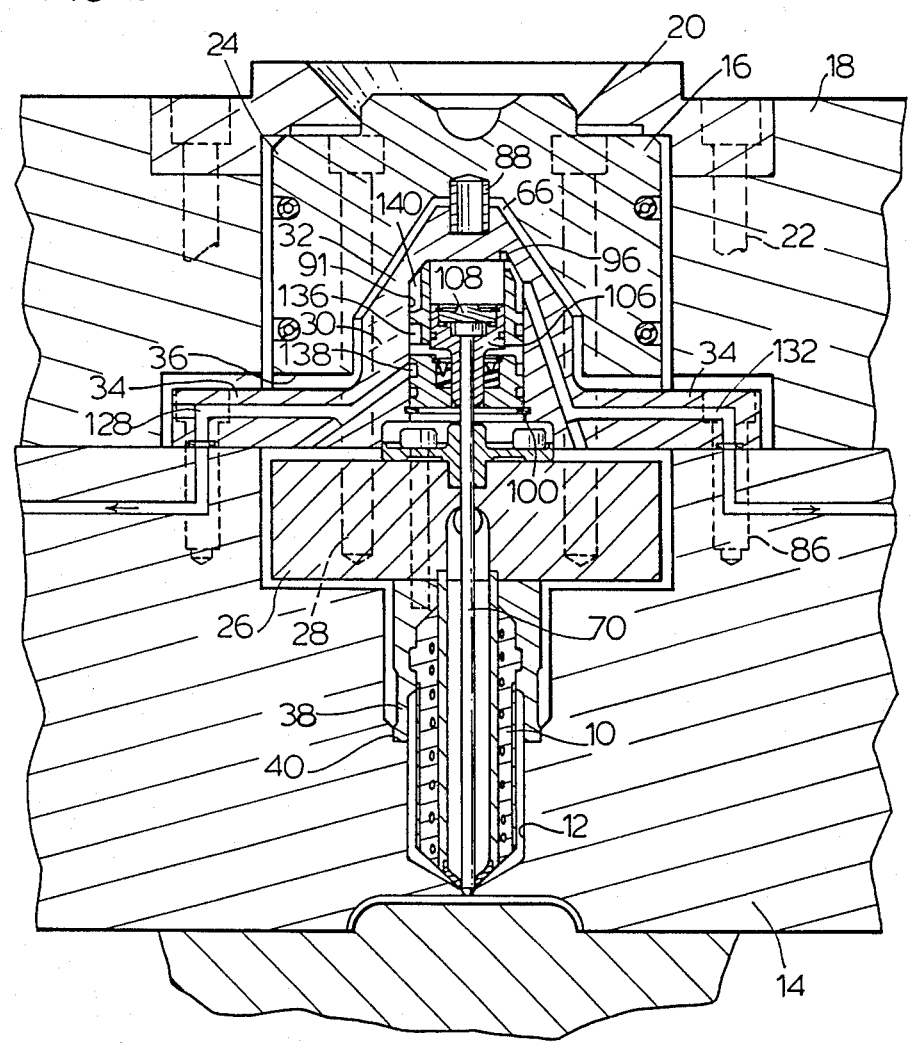
FIG. 1 is a sectional view of a portion of a single cavity valve gated injection molding system having valve pin actuating mechanism according to a preferred embodiment of the invention.
Figure 2:
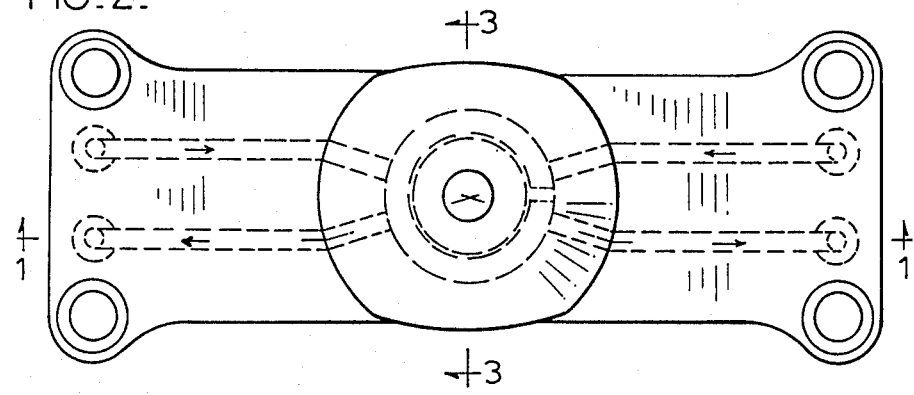
FIG. 2 is a plan view of a portion of the system seen in FIG. 1.

Reference is first made to FIG. 1 which shows a single cavity valve gated injection molding system having a heated nozzle 10 seated in a well 12 in the cavity plate 14 and a manifold housing 16 seated in the mold back plate 18. The manifold housing 16 is secured in position by a locating and retaining ring 20 which has bolts 22 extending through the mold back plate 18 into the cavity plate 14. The hollow manifold housing 16 is made of steel and has a dome portion 24 and a base portion 26 which are secured together by bolts 28. As described in more detail below, a steel cylinder housing 30 is mounted with a central portion 32 received in the dome portion 24 of the manifold housing and wing portions 34 which extend laterally out through openings 36 in the manifold housing 16.

Figure 3:
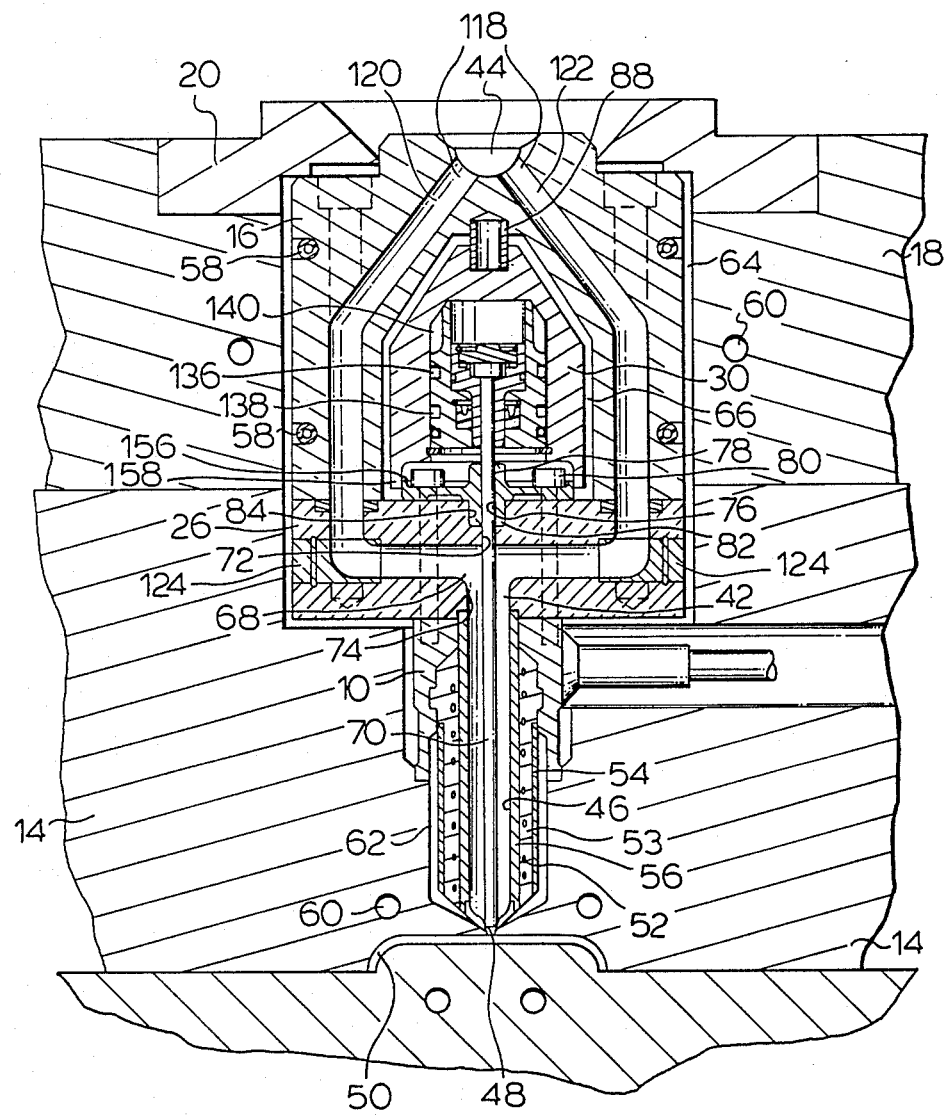
FIG. 3 is a sectional view taken along line 3—3 in FIG. 2.

The heated nozzle 10 has a locating and insulation bushing portion 38 which sits on a circumferential shoulder 40 to accurately locate the nozzle 10 in the well 12. As best seen in FIG. 3, a melt passage 42 extends through the manifold housing 16 from a central inlet 44 and through a central bore 46 in the heated nozzle 10 to a gate 48 in the cavity plate 14 to a cavity 50. In this embodiment, the heated nozzle 10 is made as described in U.S. Pat. No. 4,446,360 to Gellert entitled "Sprue Bushing Connector Assembly" which issued May 1, 1984. An electrical helical heating element 52 is cast in copper 53 between a stainless steel outer portion 54 and a stainless steel inner portion 56 which forms the central bore 46. The heated nozzle can also be made by the method described in Gellert Canadian patent application Ser. No. 496,645 entitled "Manufacturing Method for Selected Gate Configuration Injection Molding Nozzles" filed Dec. 2, 1985.

As is well known, it is essential to the successful operation of the system that the hot melt flowing through the melt passage 42 be maintained within a critical temperature range. Thus, the nozzle 10 is heated to a predetermined temperature by electrical heating element 52, and the manifold housing 16 is similarly heated by an electrical heating element 58 which is cast into it. However, the surrounding cavity plate 14 and mold back plate 18 are cooled by cooling water flowing through cooling channels 60. As is also well known, it is necessary to thermally separate the heated and cool components of the system. Consequently, an insulative air space 62 is provided between the heated nozzle 10 and the cooled cavity plate 14 by the insulation bushing portion 38 seated on shoulder 40. Another insulative air space 64 is provided between the heated manifold housing 16 and the cooled mold back plate 18. Similarly, the cylinder housing 30 which has hydraulic fluid flowing through it as described in detail below, is mounted with a further insulative air space 66 between it and the surrounding heated manifold housing 16 to avoid overheating the valve pin actuating mechanism described below.

The manifold housing 16 has a base portion 26 abutting against the nozzle 10. The base portion 26 has a central valve pin bore 68 extending in alignment with the central bore 46 of the nozzle 10 to receive the elongated valve pin 70 therethrough. The central bore 46 of the nozzle 10 is substantially larger in diameter than the valve pin 70 to allow the melt to flow through the melt passage between them. The central bore 68 of the base portion 26 of the manifold housing 16 has a first portion 72 which is drilled to snugly receive the valve pin 70, and an enlarged second portion 74 which is equal in diameter and aligned with the central bore 46 of the nozzle 10.

The valve pin 70 also extends through the central bore 76 of a valve pin bushing 78 which is mounted on the base portion 26 of the manifold housing 16 by bolts 80 which extend through into the nozzle 10 to hold them all tightly together to prevent leakage. The bushing 78 has a collar portion 82 which is seated in a well 84 in the base portion, and the central bore 76 is equal in diameter to the first portion 72 of the central bore 68 through the base portion 26. Thus, they both snugly receive the valve pin 70 therethrough and provide a seal against the leakage of pressurized melt around the reciprocating valve pin during use.

As mentioned above, the cylinder housing 30 has a central portion 32 received in the dome portion 24 of the manifold housing 16. The cylinder housing 30 is securely mounted in this position by bolts 86 which extend through the wing portions 34 into the cavity plate 14, and a cylindrical locating sleeve 88 which is seated to extend across the air space 66 between the central portion 32 of the cylinder housing and the dome portion 24 of the manifold housing 16. The cylinder housing 30 has a central well 90 with a cylindrical inner wall 91 which snugly receives a cylinder 92 with a matching generally cylindrical outer surface 94. The cylinder 92 as a locating pin portion 96 which is received in a hole in the manifold housing 16 to ensure its correct angular orientation. The cylinder 92 is retained in the well 90 by a resilient retaining or snap ring 98 which is removably received in a circumferential groove 100 in the inner wall 91 of the well 90.

The elongated valve pin 70 has an enlarged driven end 102 and a tapered tip end 104 which fits in the gate 48. The driven end 102 of the valve pin is connected to hydraulic actuating mechanism which reciprocates it between a retracted open position and a closed position in which the tip end 104 is seated in the gate 48. The actuating mechanism includes a piston 106 which reciprocates inside the cylinder 92. The valve pin 70 extends through the piston 106 and the enlarged driven end 102 is secured to it by a cap 108. The cap 108 is retained in position between a resilient O-ring 110 and a removable retaining ring 112 as described in more detail in the applicant's U.S. patent application Ser. No. 920,779 entitled "Mechanism for Valve Gated Injection Molding with Resilient Retaining Ring" filed Oct. 20, 1986. The piston 106 has an elongated neck portion 114 which extends into an opening in the cylinder 92. A V-shaped high temperature seal 116 is seated around the neck portion 114 to prevent leakage of pressurized hydraulic fluid between them.

As can best be seen in FIG. 3, the manifold housing 16 has a melt duct 118 which extends through it to form part of the melt passage 42. The melt duct 118 branches from the central inlet 44 into two arms 120, 122 which extend through opposite sides of the dome portion 24 and the base portion 26 to the valve pin bore 68 through the base portion 26. The two arms 120, 122 meet the valve pin bore 68 where the first portion 72 joins the enlarged second portion 74, and all of the corners and bends are smoothly curved to avoid turbulent melt flow. Smoothly curved bends are provided in the base portion 26 of the manifold housing 16 by brazing in plugs 124 as described in the applicant's U.S. Pat. No. 4,609,138 entitled "Method of Manufacturing Injection Molding Manifold with Plugs" which issued Sept. 2, 1986. Thus, two streams of melt flow are provided which meet at the valve pin 70 to avoid the problems of streaking and slow melt flow when the melt flows from one side only. This is discussed in more detail in the applicant's U.S. patent application Ser. No. 022,041 entitled "Dual Feed Single Cavity Injection Molding System" filed Mar. 5, 1987.

As described above, the hydraulic actuating mechanism includes the piston 106 and cylinder 92 mounted in the cylinder housing 30. The cylinder housing 30 has wing portions 34 which extend out through openings 36 in the manifold housing 16 Particular reference is now made to FIGS. 4 and 5 in describing the configuration of hydraulic fluid flow to the actuating mechanism according to a preferred embodiment of the invention. As can be seen, hydraulic fluid ducts 126, 128, 130, 132 extend through the cylinder housing 30 from the central portion 32 to the wing portions 34. The ducts are made by drilling longitudinally and diagonally and then brazing in steel plugs 134. As shown in FIG. 1, the ducts in the cylinder housing 30 connect to respective ducts in the cavity plate 14 which, in turn, connect to sources of hydraulic fluid with pressure relief valves (not shown)

to apply a pressure differential between inlet and outlet ducts on each side of the piston 106.

As best seen in FIG. 5, the outer surface 94 of the cylinder 92 is machined to form circumferential channels or ducts 136, 138, 140 between it and the cylindrical inner wall 91 of the well 90 in the cylinder housing 30. As described below, these each lead to an opening 142, 144, 146 through the cylinder and connect to the ducts in the cylinder housing to provide the desired configuration of hydraulic fluid flow.

Referring first to the hydraulic fluid flow on the valve pin opening side of the piston 106, a first inlet duct 126 through the cylinder housing 30 connects to a first circumferential channel 136 extending around the cylinder 92. This channel 136 connects to an inlet opening 142 through the cylinder wall. An outlet opening 144 on the opposite side of the cylinder leads to a second circumferential channel 138 extending around the cylinder. This second channel 138 connects to a first outlet duct 128 which extends through the same wing portion 34 of the cylinder housing 30 as the first inlet duct. Thus, when a predetermined hydraulic fluid pressure of say 350 psi. is applied to the first inlet duct 126 to drive the valve pin 70 to the open position, and a pressure relief valve in a line connected to the first outlet duct 128 is set at say 300 psi., a continuous flow of hydraulic fluid will result. This flow will be in the inlet duct 126, around circumferential channel 136, into the cylinder through inlet opening 142, through the area beneath the piston 106, out the outlet opening 144, back around both sides of the second channel 138, and out the first outlet duct 128 through the cylinder housing 30. Thus, in addition to actuating the piston 106 and valve pin 70, this flow of hydraulic fluid through this lengthy path will provide considerable cooling to the cylinder 92 and piston 106.

While a flow of hydraulic fluid around the cylinder 92 is also provided for on the closing side of the piston 106, in this embodiment the path is not as long because this area is further from the heated nozzle 10 and does not have direct exposure to the hot valve pin 70. In this case, another larger circumferential channel 140 is provided between a reduced portion of the outer surface 94 of the cylinder and the inner wall 91 of the well 90. This channel or duct 140 is interrupted by a partition or divider 148 to give the duct 140 a first end 150 and a second end 152. A second inlet duct 130 connects to the first end 150 of this channel 140, and the second end 152 of the channel connects to a second outlet duct 132. As can be seen, in this embodiment, the second inlet and outlet ducts 130, 132 extend through the same wing portion 34 of the cylinder housing 30. Another opening 146 through the cylinder is located near the second end 152 of the channel 140. Thus, during the valve pin closing portion of the injection cycle, a predetermined hydraulic fluid pressure of say 500 psi. is applied to the second inlet duct 130 and a pressure relief valve (not shown) in a line connected to the second outlet duct 132 is set at say 400 psi. This will cause hydraulic fluid to flow in through opening 146 to drive the piston 106 and valve pin 70 to the closed position and the pressure differential will establish a continuous flow of hydraulic fluid around the channel 140 to provide cooling. When the hydraulic fluid pressure is released to open the valve pin, the fluid will flow out through opening 146 as the piston 106 retracts to the open position.

Figure 4:
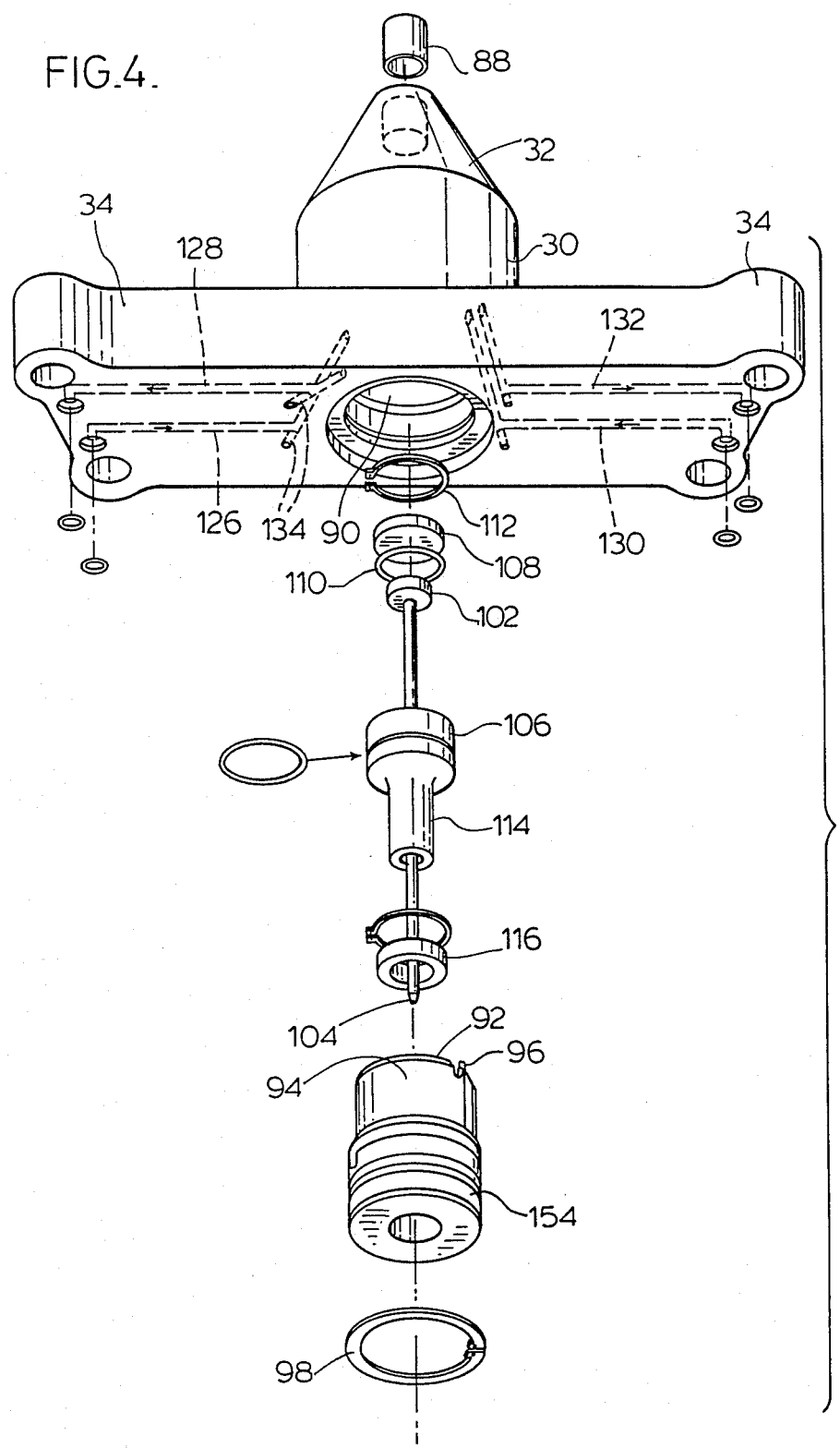
FIG. 4 is an exploded isometric view of the actuating mechanism shown in FIGS. 1-3.

After the cylinder 92 has been machined and the ducts provided in the cylinder housing 30 as described above, the system is assembled as follows. The two arms 120, 122 of the melt duct 118 through the manifold housing 16 are drilled in the dome and base portions 24, 26 before they are secured together. As seen in FIG. 4, the piston 106 is connected to the driven end 102 of the valve pin 70 and the piston is inserted into the cylinder 92. The cylinder 92 is inserted into the matching well 90 in the cylinder housing 30. An O-ring 154 is provided to prevent leakage of hydraulic fluid and the cylinder is retained in position by removable snap ring 98. The tip end 104 of the valve pin 70 is inserted through the central bores of the bushing 78, base portion 26 of the manifold housing 16, and the nozzle 10 which are secured together by bolts 80. The cylinder housing 30 is bolted in place on the cavity plate 14. The valve pin bushing 78 has an outer flanged portion 156 which is received inside an outer skirt portion 158 of the cylinder housing 30 in this assembled position. This laterally locates the manifold housing 16 in position with the air space 64 between it and the surrounding cavity plate 14 and mold back plate 18. The locating sleeve 88 is inserted and the dome portion 24 of the manifold housing 16 is bolted to the base portion 26. Finally, the locating and retaining ring 20 is secured by bolts 22 to hold the nozzle and manifold housing 16 firmly in place.

In use, the system is assembled as described above and electrical power is applied to the heating element 52 in the nozzle 10 and the heating element 58 in the manifold housing 16 to heat them to a predetermined operating temperature. Pressurized melt is then introduced into the melt passage 42 by a molding machine (not shown) positioned at the central inlet 44. Melt pressure is controlled according to a predetermined cycle in conjunction with the application of controlled hydraulic pressure through the ducts 126, 128, 130, 132 to drive the actuating mechanism. With the valve pin 70 in the retracted open position, the melt flows through the gate 48 and fills the cavity 50 and after the cavity is full, injection pressure is held momentarily to pack. During this portion of the cycle, a hydraulic fluid pressure differential is applied between the first inlet duct 126 and the first outlet duct 128 which circulates hydraulic fluid around and through the cylinder 92 to provide cooling, as described above. This hydraulic pressure is then released and pressure applied to the other side of the piston 106 to drive the piston 106 and valve pin 70 to the forward closed position with the tip end 104 of the valve pin 70 seated in the gate 48. The injection pressure is then released and this position is held for a short cooling period before the mold is opened for ejection. During this portion of the injection cycle, a pressure differential is applied between the second inlet duct 130 and the second outlet duct 132 to circulate cooling hydraulic fluid around the cylinder 92, as described above. After ejection, the mold is closed and hydraulic pressure reapplied to draw the valve pin 70 to the retracted open position. Melt injection pressure is reapplied to refill the cavity, and the molding cycle is repeated continuously every few seconds depending on the size and shape of the cavity and the type of material being molded.

While the description of the system has been given with respect to a preferred embodiment of the invention, it is not to be construed in a limiting sense. Variations and modifications will occur to those skilled in the art. For example, the various components of the system can have different shapes. Different configurations of hydraulic fluid ducts and channel can be used to provide the cooling circulation of hydraulic fluid according to the invention. Reference is made to the appended claims for a definition of the invention.

What I claim is:

1. In a valve gated single cavity injection molding system comprising heated manifolded means having a central inlet mounted in a mold back plate, a heated nozzle seated in a cavity plate with a central bore in alignment with the central inlet and a gate extending through the cavity plate to a cavity, an elongated valve pin having a driven end and a tip end mounted in a central bore of the nozzle, the driven end of the valve pin being operatively connected to a hydraulic valve pin actuating mechanism whereby the valve pin is reciprocated between a retracted open position and a closed position wherein the tip end of the valve pin is seated in the gate, and a melt passage for conveying melt from the inlet to the gate, the melt passage being offset in the manifold means around the driven end of the valve pin and the actuating mechanism connected to it and extending around the valve pin in the central bore of the nozzle, the improvement wherein the valve pin actuating mechanism comprises:

(a) a cylinder housing with a central portion securely mounted in a position wherein an insulative air space is provided between the manifold means and the cylinder housing, (b) a cylinder securely seated in the cylinder housing (c) a piston located in the cylinder and operatively connected to the driven end of the valve pin to reciprocate between the open and closed positions, and (d) hydraulic fluid ducts extending through the cylinder housing to the cylinder, the ducts including a first inlet duct and a first outlet duct leading respectively to an inlet opening and an outlet opening through the cylinder on one side of the piston, a predetermined minimum pressure differential being applied between the first inlet and outlet ducts whereby a flow of hydraulic fluid is provided through the cylinder on said one side of the piston to provide cooling to the actuating mechanism, and (e) wherein the manifold means comprises a hollow manifold housing having a base portion and a dome poriton which are secured together to enclose the central portion of the cylinder housing, the cylinder housing having wing portions which extend laterally on opposite sides of the central portion through openings in the manifold housing, the wing portions of the cylinder housing being securely attached to the cavity plate.

2. An injection molding system as claimed in claim 1 wherein the inlet and outlet openings are located on opposite sides of the cylinder.

3. An injection molding system as claimed in claim 1 wherein the hydraulic fluid ducts extend through the wing portions of the cylinder housing.

4. An injection molding system as claimed in claim 3 wherein a circumferential channels is provided between the cylinder and the cylinder housing, the channel connecting the first inlet duct in the cylinder housing to the inlet opening through the cylinder, whereby a flow of hydraulic fluid is provided around the cylinder to increase cooling.

5. An injection molding system as claimed in claim 3 wherein a circumferential channel is provided between the cylinder and the cylinder housing, the channel connecting the outlet opening through the cylinder to the first outlet duct in the cylinder housing, whereby a flow of hydraulic fluid is provided around the cylinder to increase cooling.

6. An injection molding system as claimed in claim 3 wherein first and second circumferential channels are provided between the cylinder and the cylinder housing, the first channel connecting the first inlet duct in the cylinder housing to the inlet opening through the cylinder, the second channel connecting the outlet opening through the cylinder to the first outlet duct in the cylinder housing, whereby a flow of hydraulic fluid is provided around the cylinder to increase cooling.

7. An injection molding system as claimed in claim 6 wherein the hydraulic fluid ducts include a second inlet duct and a second outlet duct, and another circumferential channel having a first and second end is provided between the cylinder and the cylinder housing, the said outer circumferential channel connecting to another opening through the cylinder on the other side of the piston, the second inlet duct connecting to the first end of the said other circumferential channel and the second outlet duct connecting to the second end of the said other circumferential channel, a predetermined minimum pressure differential being applied between the second inlet and outlet ducts whereby a flow of hydraulic fluid is provided through the other circumferential channel to increase cooling.

8. An injection molding system as claimed in claim 7 wherein the cylinder is seated in a well in the cylinder housing, the well having a cylindrical wall with a circumferential groove therein, the cylinder being retained in the well by a resilient retaining ring which is removably received in the groove.

* * * * *